(12) United States Patent
Duval et al.

(10) Patent No.: US 12,450,461 B2
(45) Date of Patent: Oct. 21, 2025

(54) CONTACTLESS SYSTEM AND METHOD FOR REDUCING ELECTROMAGNETIC DISTURBANCES OF SAID CONTACTLESS SYSTEM

(71) Applicant: THALES DIS FRANCE SAS, Meudon (FR)

(72) Inventors: Benjamin Duval, Saint-Macimin (FR); Olivier Fourquin, Fuveau (FR); Christophe Moreaux, Gardanne (FR); Laurent Fabre, Aix en Provence (FR)

(73) Assignee: THALES DIS FRANCE SAS, Meudon (FR)

( * ) Notice: Subject to any disclaimer, the term of this patent is extended or adjusted under 35 U.S.C. 154(b) by 808 days.

(21) Appl. No.: 17/782,641

(22) PCT Filed: Dec. 4, 2020

(86) PCT No.: PCT/EP2020/084641
§ 371 (c)(1),
(2) Date: Jun. 4, 2022

(87) PCT Pub. No.: WO2021/110921
PCT Pub. Date: Jun. 10, 2021

(65) Prior Publication Data
US 2023/0016826 A1 Jan. 19, 2023

(30) Foreign Application Priority Data
Dec. 6, 2019 (EP) ..................................... 19306592

(51) Int. Cl.
*G06K 19/07* (2006.01)
*G06K 19/077* (2006.01)
*H04B 5/20* (2024.01)

(52) U.S. Cl.
CPC ... *G06K 19/0709* (2013.01); *G06K 19/07771* (2013.01); *H04B 5/20* (2024.01)

(58) Field of Classification Search
None
See application file for complete search history.

(56) References Cited

U.S. PATENT DOCUMENTS 12,175,314 B2 * 12/2024 Duval ................ G06K 19/0723
2012/0056718 A1 3/2012 Leutgeb et al.
(Continued)

OTHER PUBLICATIONS

International Search Report (PCT/ISA/210) and Written Opinion (PCT/ISA/237) mailed on Jan. 28, 2021, by the European Patent Office as the International Searching Authority for current International Application No. PCT/EP2020/084641—[12 pages].

*Primary Examiner* — Carlos Garcia

(57) ABSTRACT

Provided is a contactless electronic system configured for contactless communications with a reader over an electromagnetic field and comprising a power supply, a current monitor, a processing system comprising a hardware processor configured for performing operations, a dynamic extra current loader and a clock generator. The current monitor is configured for determining maximal current Imax that can be provided by the power supply to the processing system from the electromagnetic field, and is configured for comparing, during an execution phase of said hardware processor, said determined maximal current Imax and a current drawn by the processing system.

15 Claims, 7 Drawing Sheets

(56) References Cited

U.S. PATENT DOCUMENTS

2018/0345812 A1   12/2018  Chaturvedi et al.
2020/0089141 A1*   3/2020  Shiraki .................. G03G 15/55
2023/0016826 A1*   1/2023  Duval ...................... H04B 5/77

* cited by examiner

Fig. 2
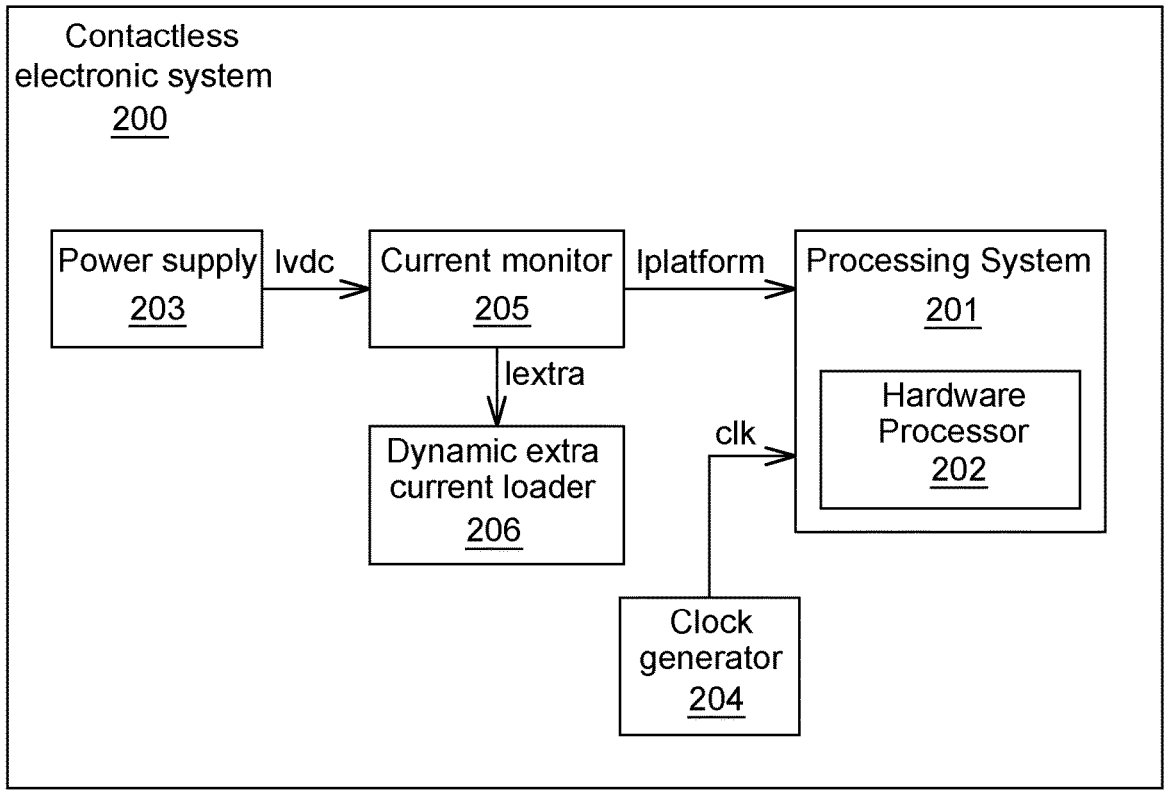
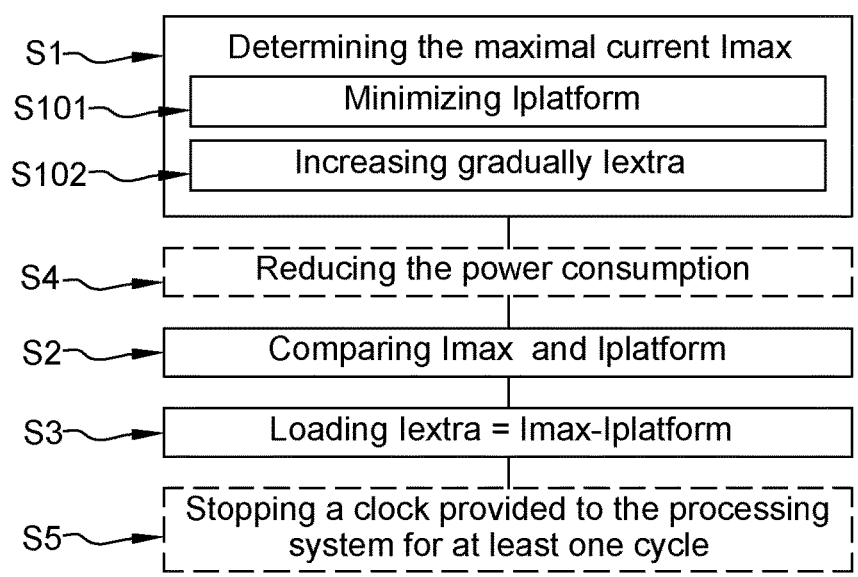
Fig. 3

| H | Imax |
|---|---|
| 1.5 | 2.6 |
| 2 | 3.8 |
| 3 | 6.2 |
| 4.5 | 9.8 |
| 7.5 | 10.5 |
| 10 | 10.5 |

CONTACTLESS SYSTEM AND METHOD FOR REDUCING ELECTROMAGNETIC DISTURBANCES OF SAID CONTACTLESS SYSTEM

FIELD OF THE INVENTION

The present invention relates to the field of contactless communications, and more particularly to a contactless device and a corresponding method avoiding to create electromagnetic disturbances between the device and a reader during the operations of a processor of the device.

BACKGROUND OF THE INVENTION

As shown on FIG. 1, contactless devices such as RFID powered smartcards alternate phases of communication with a reader (RX and TX on FIG. 1) and phases of CPU computations (EXE on FIG. 1). The current consumption (Iplatform) of such a device during CPU computation may be very variable depending on CPU activity which may be more or less intensive. Such variations of power consumption may occur frequently and may induce variations of the electromagnetic emissions RF of the contactless device. Such variations may be misinterpreted by a reader as a communication attempt, at a time when the next communication phase of the device has not started yet.

Consequently, there is a need for a contactless device and an associated method that does not produce, during CPU computation phases, electromagnetic emissions that could interfere with RF communications between the contactless device and a RF reader.

SUMMARY OF THE INVENTION

For this purpose and according to a first aspect, this invention therefore relates to a contactless electronic system configured for contactless communications with a reader over an electromagnetic field and comprising a power supply, a current monitor, a processing system comprising a hardware processor configured for performing operations, a dynamic extra current loader and a clock generator, wherein:
    said current monitor is configured for determining the maximal current Imax that can be provided by the power supply to the processing system from the electromagnetic field,
    said current monitor is configured for comparing, during an execution phase of said hardware processor, said determined maximal current Imax and a current drawn by the processing system Iplatform,
    said dynamic extra current loader is configured for loading an extra current Iextra equal to Imax−Iplatform when the current drawn by the processing system Iplatform is lower than the determined maximal current Imax.

Such a system enables to greatly reduce the electromagnetic disturbances caused by the system despite variations in the current consumption of the processing system.

Said hardware processor, may be configured for reducing its power consumption depending on said determined maximal current Imax in order to prevent a collapse of the power supply.

Said hardware processor may for example be configured for reducing its power consumption by reducing its operating voltage, by deactivating internal blocks of said hardware processor or by reducing its operating frequency.

When the current drawn by the processing system Iplatform is higher than the determined maximal current Imax, said clock generator may be configured for stopping a clock provided to the processing system by the clock generator for at least one cycle in order to prevent a collapse of the power supply.

By doing so, any further increase of the current consumption of the processing system is prevented, further preventing any collapse of the power supply.

In an embodiment, said current monitor is configured for continuously performing said comparison between said determined maximal current Imax and said current drawn by the processing system Iplatform, and said dynamic extra current loader is configured for continuously loading said extra current Iextra, until an end of said execution phase.

It enables to keep the total current loaded by the system constant and equal to the determined maximal current Imax during all the execution phase despite variations of the current consumption of the processing system.

According to a second aspect, this invention relates to a method for reducing the electromagnetic disturbances of a contactless electronic system configured for contactless communications with a reader over an electromagnetic field and comprising a power supply, a current monitor, a processing system comprising a hardware processor configured for performing operations, a dynamic extra current loader and a clock generator, comprising, performed by said contactless electronic system:
    determining the maximal current Imax provided by the power supply to the processing system from the electromagnetic field, by said current monitor,
    during an execution phase of said hardware processor, comparing said determined maximal current Imax and a current drawn by the processing system Iplatform by said current monitor,
    when the current drawn by the processing system Iplatform is lower than the determined maximal current Imax, loading an extra current Iextra equal to Imax−Iplatform by said dynamic extra current loader.

The method according to the second aspect may comprise: reducing, by said hardware processor, its power consumption depending on said determined maximal current Imax, in order to prevent a collapse of the power supply.

Said hardware processor may for example reduce its power consumption by reducing its operating voltage, by deactivating internal blocks of said hardware processor or by reducing its operating frequency.

When the current drawn by the processing system Iplatform is higher than the determined maximal current Imax, the method according to the second aspect may comprise: stopping, by said clock generator, a clock provided to the processing system by the clock generator for at least one cycle in order to prevent a collapse of the power supply.

The method according to the second aspect may comprise: continuously performing, said comparison by said current monitor between said determined maximal current Imax and said current drawn by the processing system Iplatform, and said loading by the dynamic extra current loader of said extra current Iextra until an end of said execution phase.

Such a method has the same advantages as the electronic system described above.

According to a third aspect, this invention relates to a computer program product directly loadable into the memory of at least one computer, comprising software code instructions for performing the steps of the method according to the second aspect of the invention when said product is run on the computer.

To the accomplishment of the foregoing and related ends, one or more embodiments comprise the features hereinafter fully described and particularly pointed out in the claims.

BRIEF DESCRIPTION OF THE DRAWINGS

The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

FIG. 2 is a schematic illustration of a contactless electronic system according to an embodiment of the present invention;

FIG. 3 is a schematic illustration of a method for reducing the electromagnetic disturbances of a contactless electronic system according to an embodiment of the present invention;

DETAILED DESCRIPTION OF EMBODIMENTS OF THE INVENTION

Figure 1:
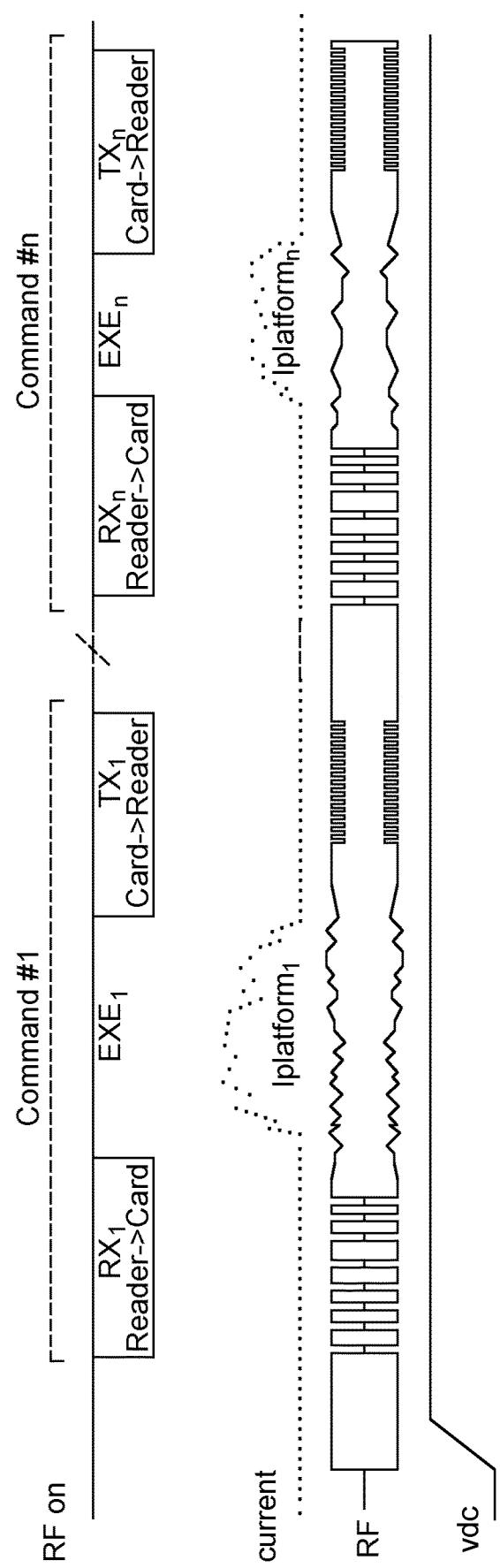
FIG. 1 is a schematic illustration of communication phases and of CPU computations of a contactless system according to the prior art.

According to a first aspect, the invention relates to a contactless electronic system configured for contactless communications with a reader over an electromagnetic field. Such a contactless electronic system may for example be an electronic identity document such as a passport, or a smartcard such as a payment card.

As shown on FIG. 2, the contactless electronic system 200 comprises a processing system 201 comprising a hardware processor 202 configured for performing operations, and a power supply 203 harvesting energy from the electromagnetic field provided by the reader, and providing power to the processing system, and a clock generator 204 providing a clock signal to the processing system. The processing system may include additional components of a usual digital system such as one or more memories, buses, input/output interfaces . . . .

In order to avoid the execution of operations by the processor causing electromagnetic disturbance with the reader, the main idea of the invention is to make the total current consumption of the contactless electronic system constant during the executions phases of the processor. In order to do so, as shown on FIG. 2, the contactless electronic system 200 also comprises a current monitor 205 and a dynamic extra current loader 206.

Such a current monitor may be used to determine the maximal current that can be provided by the power supply to the processing system from the electromagnetic field; and then to monitor the current really drawn by the processing system in comparison to this maximal current.

The dynamic extra current loader may be used to draw an extra current from the power supply in addition to the current drawn by the processing system, in order to make the total current drawn from the power supply constant, whatever the operations executed by the processor and whatever their power consumption.

The following paragraphs describe with more details the steps of a method according to a second aspect of the invention for reducing the electromagnetic disturbances of a contactless electronic system, as shown on FIG. 3.

In a first step S1, the current monitor determines the maximal current Imax provided by the power supply to the processing system from the electromagnetic field.

Figure 4:
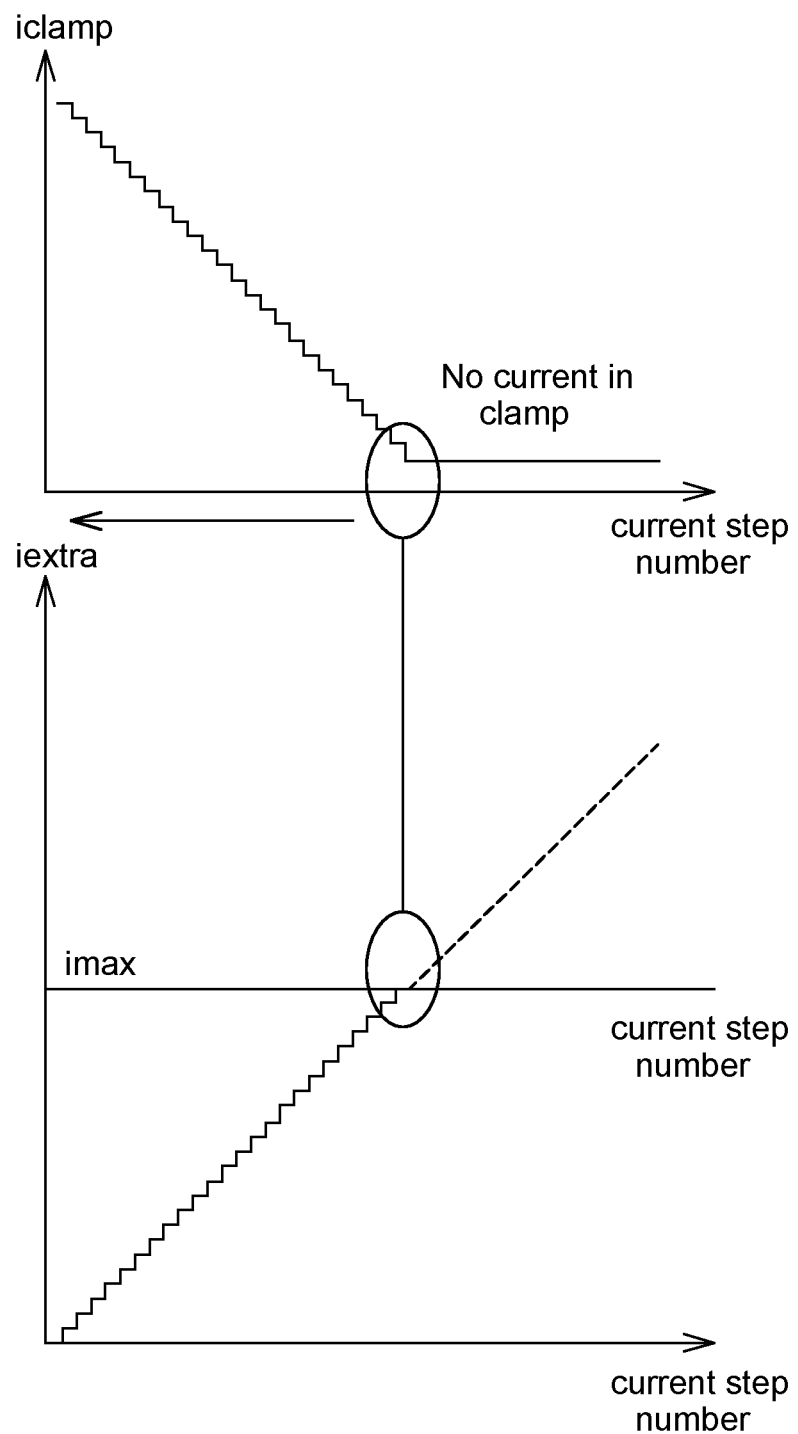
FIG. 4 is a schematic illustration of an embodiment for determining the maximal current.

In order to measure the maximal current Imax, the power supply includes a clamp circuit. In a first measurement step S101, the processing system may put itself in a quiescent mode in order to minimize its power consumption. The power supply then provides a minimal current to the processing system, and all the rest to the clamp circuit. In order to minimize the current drawn by the processing system, it may be turned off. Then, as shown on FIG. 4, during a second measurement step S102, the electronic system may gradually increase the extra current Iextra, which makes the current through the clamp circuit Iclamp decrease until it gets equal to zero. The maximal current Imax that can be provided to the processing system is the value of the extra current at that time.

Such a measurement of the maximal current Imax may be performed at the beginning of an execution phase of the hardware processor or earlier, for example during a startup phase of the electronic system. It is also possible to reevaluate Imax during execution phase periodically thanks to a watchdog interruption or after an event indicating a field strength modification.

In some cases, the field of the reader may be strong enough to provide to the electronic system more power than its maximum power consumption. In such a case, at some point during the second measurement step S102 the extra current Iextra will exceed a predefined maximal possible current consumption of the processing system while some current is still flowing through the clamp circuit. In such a case the second measurement step may come to an end and the maximal current Imax may be set to a predefined value greater than the predefined maximal possible current consumption of the processing system even if the actual maximal current that may be drawn from the electromagnetic field has not been measured.

Figures 5, 6:
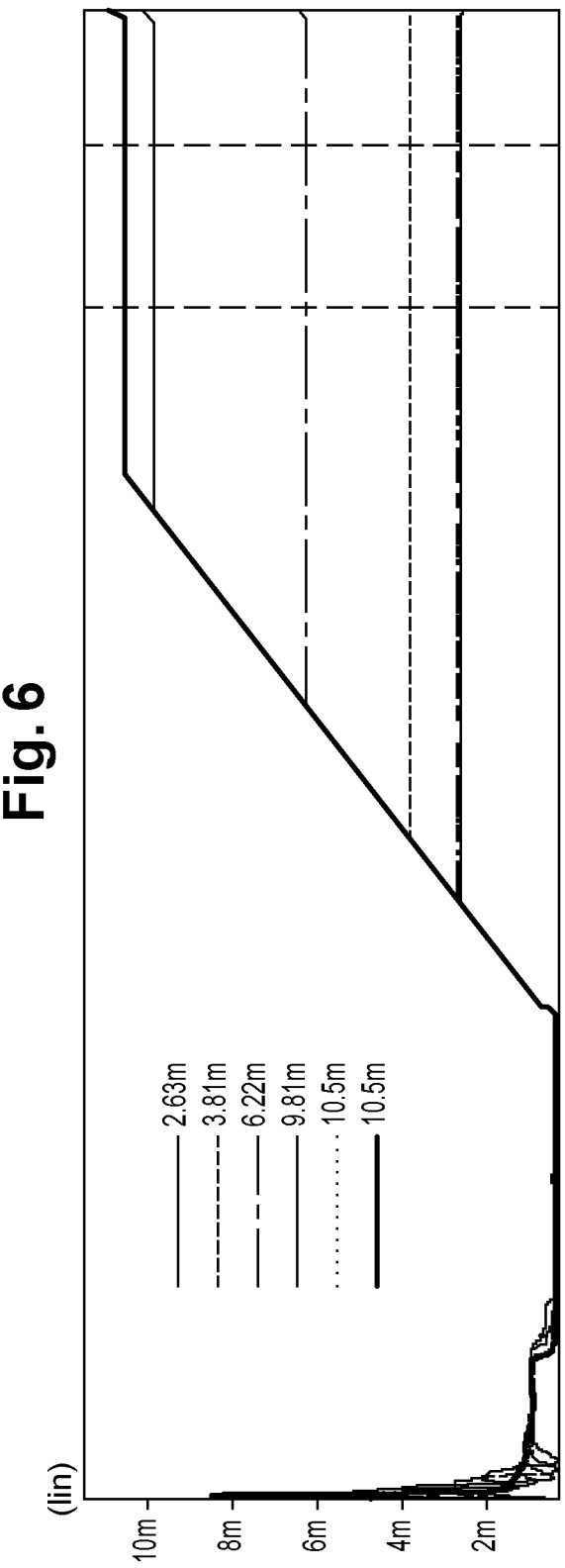
FIG. 5 gives examples of values of the maximal current Imax determined for different strength of the electromagnetic field H.
FIG. 6 gives examples of the variation of the extra current Iextra for the different field strength of FIG. 5.

The table of FIG. 5 gives values of the maximal current Imax determined for different strength of the electromagnetic field H. For the two last values of the table, the field is strong enough to provide enough energy to the electronic system whatever the activity of the processor and the maximal current Imax is set to the predefined value 10.5 mA. The variation of the extra current Iextra during this first step for the different field strength of FIG. 5 is shown on FIG. 6. The extra current Iextra gradually increases until it reaches the value of Imax shown on FIG. 5 corresponding to the field strength at the time the measurement is performed.

At the end of the first step S1, the processing system may be turned on again if it had been turned off during the first step.

In a second step S2, during the execution phase, the current monitor compares the determined maximal current Imax and the current actually drawn by the processing system, called Iplatform, as shown on FIG. 2.

The dynamic extra current loader may then perform an action depending on the result of the comparison between Imax and Iplatform.

In a third step S3, when the current drawn by the processing system Iplatform is lower than the determined maximal available current Imax, the dynamic extra current loader loads an extra current Iextra equal to Imax−Iplatform. In order to do so, the current monitor may either compute Iextra and provide it to the dynamic extra current loader, or the current monitor may provide both Imax and Iplatform to the dynamic extra current loader and let it determine Iextra.

Such a comparison by said current monitor between the determined maximal current Imax and the current drawn by the processing system Iplatform, and such a loading by the dynamic extra current loader of said extra current Iextra may be performed continuously until the end of the execution phase. By doing so, the total current consumption of the electronic system may be kept constant along all the execution phase of the processor.

Figure 7:
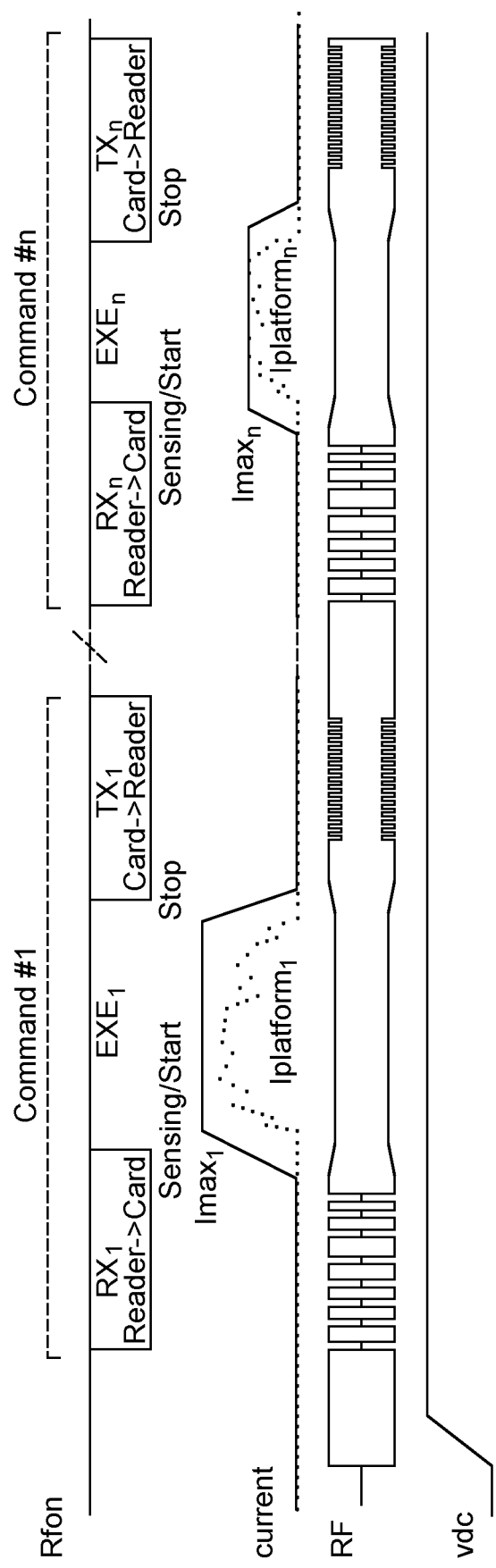
FIG. 7 gives examples of resulting current consumption during an execution phase of the processor according to the present invention.

The resulting current consumption during an execution phase of the processor is shown on FIG. 7. During most of the execution phase, the current consumption is equal to Imax, whatever the value of the current consumption of the processor, noted Iplatform. As a result, the electromagnetic emissions of the processor during such an execution phase are almost constant, which greatly reduces the electromagnetic disturbances to the communication with the reader.

At the end of the execution phase, the processing system may be turned off again and all the current drawn from the field may flow through the clamp circuit.

Since the current drawn by the processing system and the maximal current provided by the power supply are known, the system may also be configured to prevent the processing system from drawing too much current and causing a power supply collapse.

In order to do so, in a fourth step S4, the hardware processor may reduce its power consumption depending on said determined maximal current Imax, in order to prevent a collapse of the power supply that could occur when the current drawn by the processing system Iplatform is higher than the determined maximal current Imax that can be provided. In order to reduce its power consumption, the hardware processor may for example go into an energy saving mode resulting in a reduction of its operating voltage, a reduction of its operating frequency or a deactivation of some of its internal blocks, such as its processing units in the case of a processor with multiple execution cores. In order to be aware of its overconsumption, the processor may get the value of Imax from the current monitor and may monitor its own power consumption. Alternatively it may be warned by a message or by values of Imax and Iplatform or Iextra transmitted by the current monitor or by the dynamic extra current loader.

In addition, when the current drawn by the processing system Iplatform is higher than the determined maximal current Imax that can be provided to the processing system, in a fifth step S5, the clock generator may stop the clock it provides to the processing system for at least one cycle in order to prevent a collapse of the power supply. Doing so will slow down the processor and eventually reduce its current consumption Iplatform. The clock generator may be instructed to do so by the current monitor or by the dynamic extra current loader.

The fourth and fifth steps are two different ways of preventing a collapse of the power supply. They may be performed concurrently.

Figure 8:
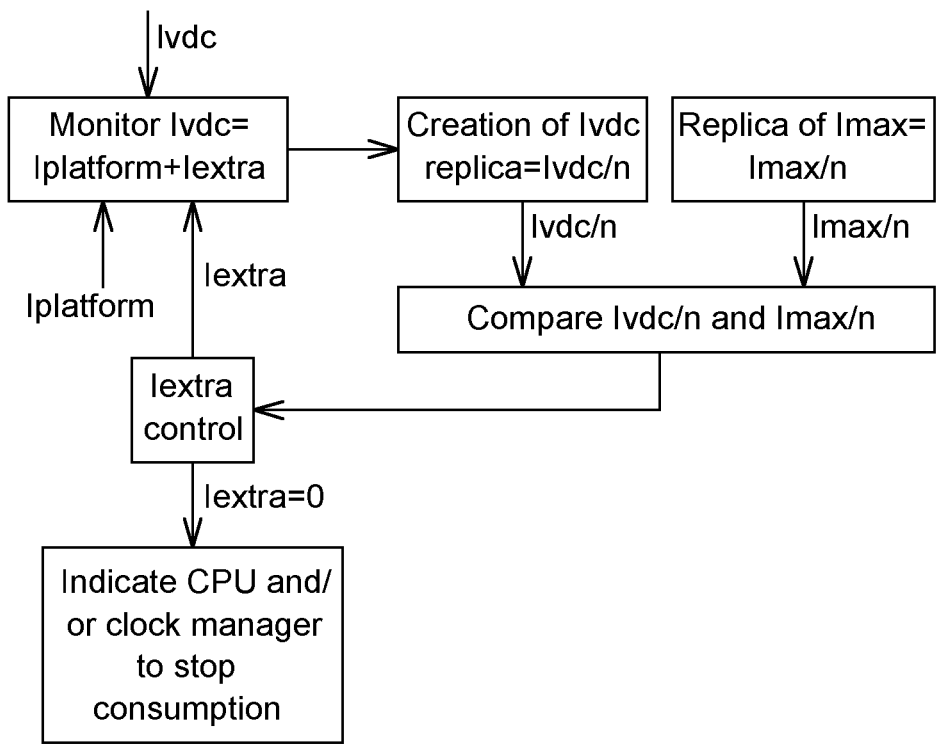
FIGS. 8 and 9 are schematic illustrations of an architecture of the current monitor for performing the current monitoring according to the present invention.
Figure 9:
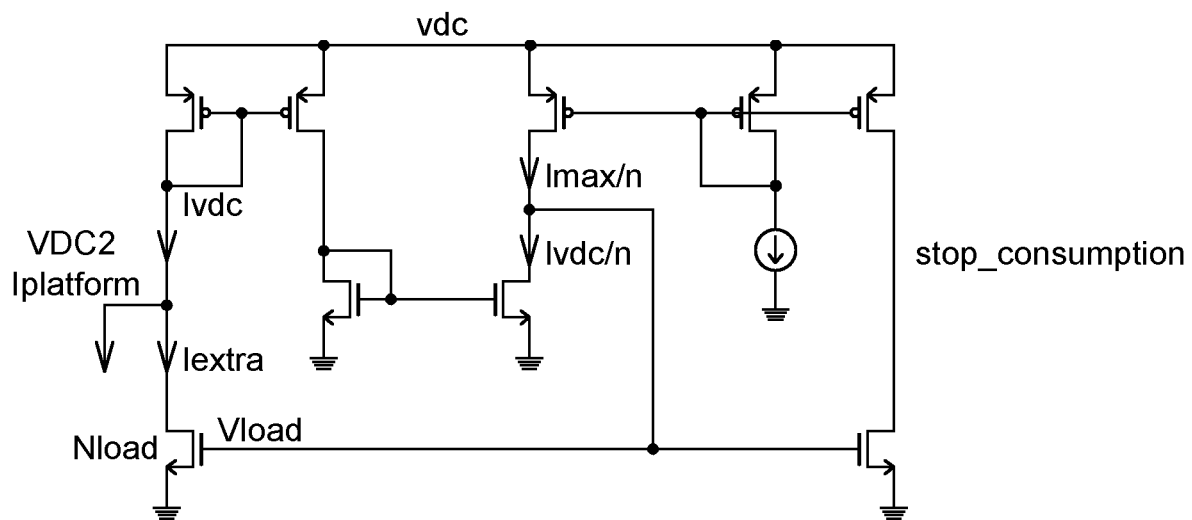

An example of architecture of the current monitor for performing such a current monitoring is shown FIGS. 8 and 9. Such an architecture creates a signal Ivdc=Iplatform+Iextra and includes a regulation loop of the extra current Iextra which increases Iextra when Ivdc<Imax and decreases Iextra when Ivdc>Imax. Instead of working directly on Ivdc and Imax values, the current monitor may generate replicas of lower intensity Ivdc/n and Imax/n with n a predefined value.

Figure 10:
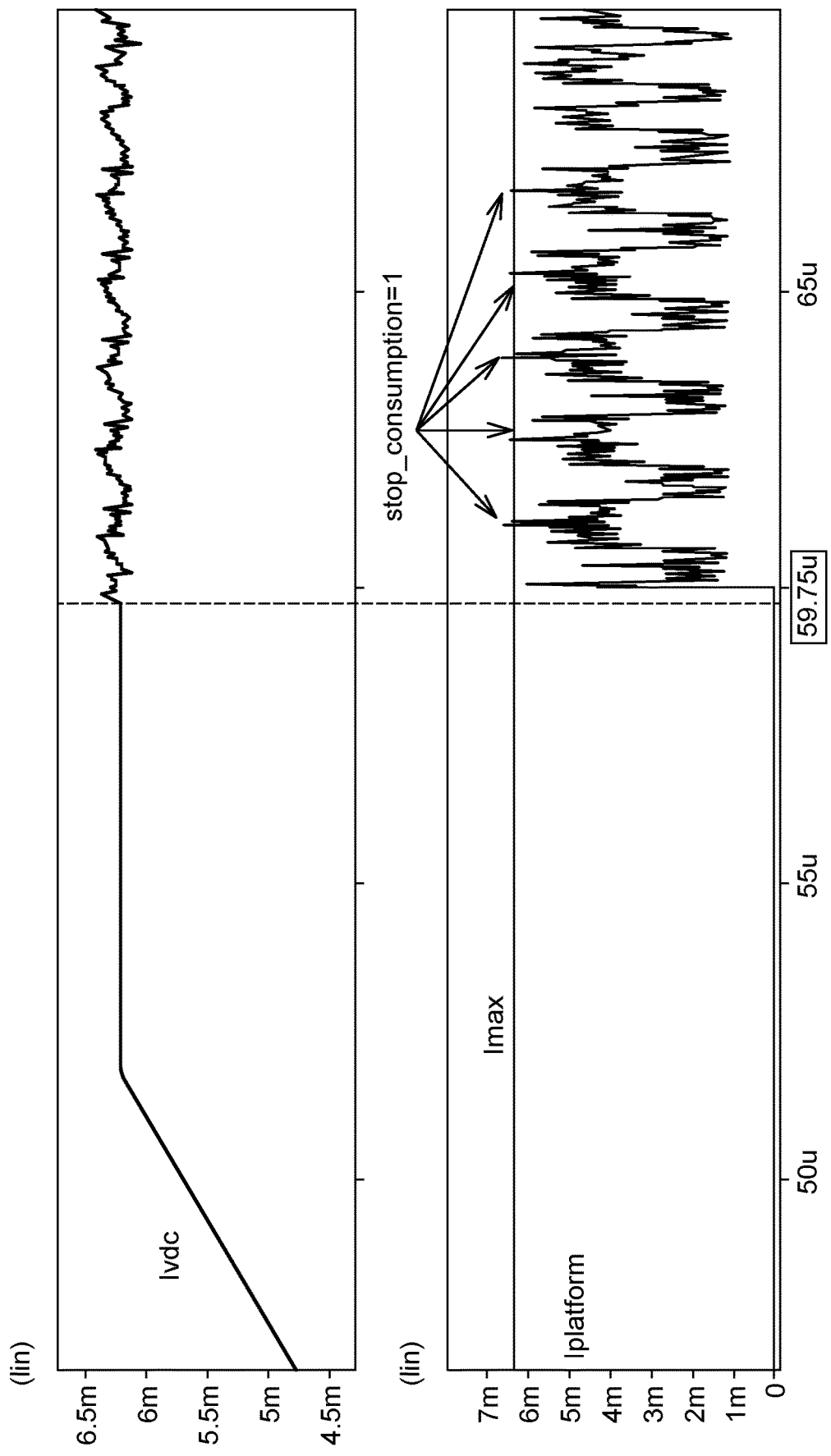
FIG. 10 shows an example of variations of Ivdc and Iplatform during an execution phase of the processing system.

FIG. 10 shows an example of variations of Ivdc and Iplatform during an execution phase of the processing system. In this example, Imax is set to 6.2 mA. During the first step, Iplatform is very low and Iextra is gradually increased until Ivdc reaches Imax. Then during the second step, Iplatform varies between 1 mA and 6 mA, but Iextra is continuously adapted which enables to keep Ivdc almost constant. The small variations of Ivdc generate much less electromagnetic disturbance than Iplatform variations would if it no extra current was loaded. On this Figure, Iplatform slightly goes above Imax five times. Each time, the clock generator stopped the clock provided to the processor, which effectively prevented any further increase of Iplatform and Ivdc and any collapse of the power supply.

According to a third aspect, the invention relates to a computer program product directly loadable into the memory of at least one computer, comprising software code instructions for performing, when said product is run on the computer, the steps of the method described here before.

In addition to these features, the method and the computer program according to the second and third aspects of the invention may be configured for performing or may comprise any other features described here before.

The invention claimed is:

1. A contactless electronic system configured for contactless communications with a reader over an electromagnetic field and comprising a power supply, a current monitor, a processing system comprising a hardware processor configured for performing operations, a dynamic extra current loader and a clock generator, wherein:
   said current monitor is configured for determining the maximal current, Imax, that can be provided by the power supply to the processing system from the electromagnetic field,
   said current monitor is configured for comparing, during an execution phase of said hardware processor, said determined maximal current (Imax) and a current drawn by the processing system, Iplatform, and
   said dynamic extra current loader is configured for loading an extra current, I extra, equal to Imax minus Iplatform when the current drawn by the processing system, Iplatform, is lower than the determined maximal current, Imax.

2. The system of claim 1, wherein, said hardware processor, is configured for reducing its power consumption depending on said determined maximal current, Imax, in order to prevent a collapse of the power supply.

3. The system of claim 2, wherein, said hardware processor, is configured for reducing its power consumption by reducing its operating voltage.

4. The system of claim 2, wherein, said hardware processor, is configured for reducing its power consumption by deactivating internal blocks of said hardware processor.

5. The system of claim 2, wherein, said hardware processor, is configured for reducing its power consumption by reducing its operating frequency.

6. The system according to claim 1, wherein when the current drawn by the processing system, Iplatform, is higher than the determined maximal current, Imax, said clock generator (204) is configured for stopping a clock provided to the processing system by the clock generator for at least one cycle in order to prevent a collapse of the power supply.

7. The system according to claim 1, wherein said current monitor (205) is configured for continuously performing said comparison between said determined maximal current, Imax, and said current drawn by the processing system, Iplatform, and said dynamic extra current loader (206) is configured for continuously loading said extra current, Iextra, until an end of said execution phase.

8. A method for reducing the electromagnetic disturbances of a contactless electronic system configured for contactless communications with a reader over an electromagnetic field and comprising a power supply, a current monitor, a processing system comprising a hardware processor configured for performing operations, a dynamic extra current loader and a clock generator, comprising, performed by said contactless electronic system:
   determining (S1) the maximal current, Imax, provided by the power supply to the processing system from the electromagnetic field, by said current monitor,
   during an execution phase of said hardware processor, comparing (S2) said determined maximal current, Imax, and a current drawn by the processing system, Iplatform, by said current monitor,
   wherein when the current drawn by the processing system, Iplatform, is lower than the determined maximal current (Imax), loading (S3) an extra current, Iextra, equal to Imax minus Iplatform by said dynamic extra current loader.

9. The method of claim 8, comprising reducing (S4), by said hardware processor, its power consumption depending on said determined maximal current, Imax, in order to prevent a collapse of the power supply.

10. The method of claim 9, wherein said hardware processor reduces its power consumption by reducing its operating voltage.

11. The method of claim 9, wherein said hardware processor reduces its power consumption by deactivating internal blocks of said hardware processor.

12. The method of claim 9, wherein said hardware processor reduces its power consumption by reducing its operating frequency.

13. The method according to claim 8, comprising, when the current drawn by the processing system, Iplatform, is higher than the determined maximal current (Imax), stopping (S5), by said clock generator, a clock provided to the processing system by the clock generator for at least one cycle in order to prevent a collapse of the power supply.

14. The method according to claim 8, comprising continuously performing, said comparison by said current monitor between said determined maximal current (Imax) and said current drawn by the processing system, Iplatform, and said loading by the dynamic extra current loader of said extra current, Iextra, until an end of said execution phase.

15. A computer program product directly loadable into the memory of at least one computer, comprising software code instructions for reducing the electromagnetic disturbances of a contactless electronic system configured for contactless communications with a reader over an electromagnetic field and comprising a power supply, a current monitor, a processing system, Iplatform, comprising a hardware processor configured for performing operations, a dynamic extra current loader and a clock generator, the computer program
   determines (S1) the maximal current, Imax, provided by the power supply to the processing system from the electromagnetic field, by said current monitor,
   during an execution phase of said hardware processor, compares (S2) said determined maximal current (Imax) and a current drawn by the processing system by said current monitor,
   wherein when the current drawn by the processing system is lower than the determined maximal current, Imax, loading (S3) an extra current, Iextra, equal to Imax minus Iplatform by said dynamic extra current loader.

* * * * *